United States Patent
Bushelle et al.

[11] Patent Number: 5,920,981
[45] Date of Patent: Jul. 13, 1999

[54] METHOD OF MANUFACTURING A ROTOR FOR AN ELECTROMAGNETIC CLUTCH ASSEMBLY

[75] Inventors: R. James Bushelle; Danny L. Gander, both of Beloit, Wis.; Michael J. Siegmund, Rockford, Ill.; David J. Yaniak, Janesville, Wis.

[73] Assignee: Dana Corporation, Toledo, Ohio

[21] Appl. No.: 08/823,990

[22] Filed: Mar. 25, 1997

[51] Int. Cl.$^6$ .................................................... H01F 41/02
[52] U.S. Cl. ........................... 29/607; 29/602.1; 72/340; 72/403; 72/414; 192/84.31
[58] Field of Search .................................... 29/602.1, 607, 29/880; 192/84.3, 84.31; 72/340, 403, 414

[56] References Cited

U.S. PATENT DOCUMENTS

| | | |
|---|---|---|
| 4,698,610 | 10/1987 | Pick . |
| 5,096,036 | 3/1992 | Booth et al. . |
| 5,125,255 | 6/1992 | Brown et al. . |
| 5,137,132 | 8/1992 | Cerny . |
| 5,445,259 | 8/1995 | Nelson . |
| 5,551,546 | 9/1996 | Tabayama et al. . |

*Primary Examiner*—Carl E. Hall
*Attorney, Agent, or Firm*—MacMillan, Sobanski & Todd, LLC

[57] ABSTRACT

A method for manufacturing a rotor for use in an electromagnetic friction clutch includes the initial step of forming a flat circular blank of material into a generally cup-shaped outer rotor piece including a flat circular base portion and an annular flange portion. A piercing operation is performed to form a non-circular opening through the base portion of the outer rotor piece. Then, a plurality of concentric arrays of discontinuous recesses are formed sequentially in the outer rotor piece from the radially outermost area of the base portion to the radially innermost area of the base portion. This sequential forming virtually eliminates any manufacturing related stresses in the radially innermost region of bridge areas defined between adjacent recesses, while focusing such stresses toward the radially outermost regions of the bridge areas. A piercing operation is next performed on the outer rotor piece so as to form a circular opening therethrough. Next, a portion of the outer circumferential surface of the annular flange portion of the outer rotor piece is deformed so as to provide a circumferential rib thereabout. The next step in the method is to form a precise circumferential inner surface for the opening. This inner circumferential surface provides a seat to accurately position a hollow cylindrical inner rotor piece relative to the outer rotor piece. The inner rotor piece is also formed from a magnetically permeable material, such as a ferromagnetic material, and includes an axially extending protrusion which extends within the opening and is piloted on the axially extending surface. The inner rotor piece can then be secured to the outer rotor piece in a conventional manner, such as by laser welding, to form a rotor preform. Lastly, portions of the rotor preform are finish machined to form a rotor.

11 Claims, 8 Drawing Sheets

METHOD OF MANUFACTURING A ROTOR FOR AN ELECTROMAGNETIC CLUTCH ASSEMBLY

BACKGROUND OF THE INVENTION

This invention relates in general to electromagnetic clutch assemblies and in particular to a method of manufacturing a rotor for use in an electromagnetically actuated friction clutch.

Clutches are well known devices which are commonly used in machinery to selectively connect a source of rotational power to a rotatably driven mechanism. A basic clutch structure includes an input member connected to the source of rotational power, an output member connected to the rotatably driven mechanism, and means for selectively connecting the input member to the output member for concurrent rotation. When the means for selectively connecting is engaged, the input member is connected to the output member so as to rotatably drive the mechanism. When the means for selectively connecting is disengaged, the input member is disconnected from the output member, and the mechanism is not rotatably driven. Many different types of clutches are known in the art for accomplishing this general purpose.

In some clutches, the input member and the output member are axially fixed in position relative to one another. An armature is connected to the output member for rotation therewith and for axial movement relative thereto. The armature is axially movable between a disengaged position, wherein it is spaced apart from the input member, and an engaged position, wherein it frictionally engages the input member. The armature is normally maintained in the disengaged position, wherein it does not frictionally engage the input member and, therefore, is not rotatably driven thereby. When moved to the engaged position, however, the armature frictionally engages the input member so as to be rotatably driven. Friction clutches of this general type are well known in the art.

In some friction clutches, an electromagnet is used to cause selective movement of the armature between the engaged and disengaged positions. Electromagnetically actuated friction clutches of this general type operate on the principle that a magnetic field which is created about a component formed from a magnetically permeable material will exert a mechanical force on a nearby component. This mechanical force will urge the component to move to a position of minimum resistance relative to the flow of magnetic flux (lines of force) generated by the magnetic field, usually referred to as a position of minimum reluctance. Thus, in electromagnetically actuated friction clutches, the input member and the armature are both formed from a magnetically permeable material. When the electromagnet is energized, the electromagnetic field generated thereby attracts the armature toward the input member. As a result, the armature is moved from the disengaged position to the engaged position, connecting the input shaft to the output shaft and causing the driven device to be rotatably driven by the source of rotational power.

In a typical electromagnetically actuated friction clutch, the input member is embodied as an annular rotor which is generally U-shaped in cross section. Such a rotor includes an outer circumferential wall, a concentric inner circumferential wall, and a pole face extending radially therebetween. In many instances, a pulley is wrapped about the outer circumferential wall of the pulley to provide a driving connection between the source of rotational power and the rotor. When the clutch is in the disengaged position, the pole face of the rotor is separated from the armature by a relatively small air gap. Frequently, the pole face of the rotor (and armature also) can be divided into at least two magnetic poles by recesses or slots. The discrete poles cause the magnetic flux generated by the energized electromagnet to jump back and forth several times across the air gap separating the rotor and the armature. As is well known, this magnetic flux discontinuity structure, or more simply flux break, provides the magnetic attraction between the rotor and the armature.

In the past, the rotor has been manufactured using a combination of conventional metal working and machining processes. However, known rotor manufacturing processes suffer from several drawbacks. In particular, it has been found that known manufacturing processes require a relatively large number of such metal working and machining processes which are time consuming and, therefore, inefficient. Also, known manufacturing processes require the removal of a relatively large amount of material, which is also inefficient. Third, known manufacturing processes have been found to create internal stresses within the rotor at undesirable locations, thereby reducing the strength of the rotor. Thus, it would be desirable to provide an improved method for manufacturing a rotor for use in an electromagnetic friction clutch which addresses these problems.

SUMMARY OF THE INVENTION

This invention relates to an improved method for manufacturing a rotor for use in an electromagnetic friction clutch. Initially, a flat circular blank of material is formed into a generally cup-shaped outer rotor piece including a flat circular base portion and an annular flange portion. A piercing operation is performed to form a non-circular opening through the base portion of the outer rotor piece. Then, a plurality of concentric rows of discontinuous recesses are formed sequentially in the outer rotor piece from the radially outermost area of the base portion to the radially innermost area of the base portion. This sequential forming virtually eliminates any manufacturing related stresses in the radially innermost region of bridge areas defined between adjacent recesses, while focusing such stresses toward the radially outermost regions of the bridge areas. A piercing operation is next performed on the outer rotor piece so as to form a circular opening therethrough. Next, a portion of the outer circumferential surface of the annular flange portion of the outer rotor piece is deformed so as to provide a circumferential rib thereabout. The next step in the method is to form a precise circumferential inner surface for the opening. This inner circumferential surface provides a seat to accurately position a hollow cylindrical inner rotor piece relative to the outer rotor piece. The inner rotor piece is also formed from a magnetically permeable material, such as a ferromagnetic material, and includes an axially extending protrusion which extends within the opening and is piloted on the axially extending surface. The inner rotor piece can then be secured to the outer rotor piece in a conventional manner, such as by laser welding, to form a rotor preform. Lastly, portions of the rotor preform are finish machined to form a rotor.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
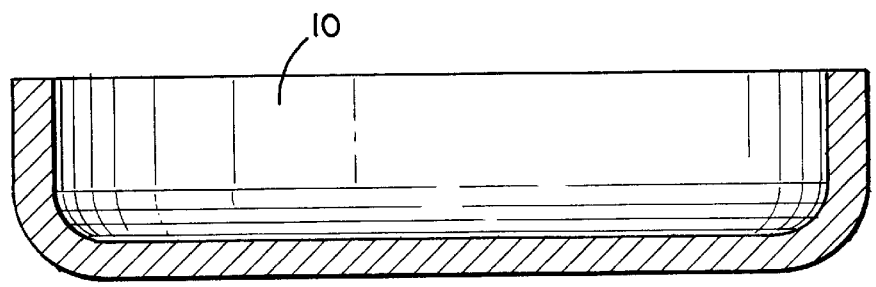
FIGS. 1, 2, and 3 are sectional elevational views showing the initial forming steps of the method of this invention for forming a flat circular blank into a partially formed outer rotor piece.
Figure 2:
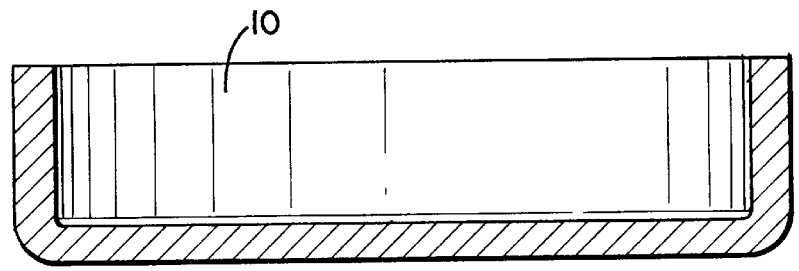
Figure 3:
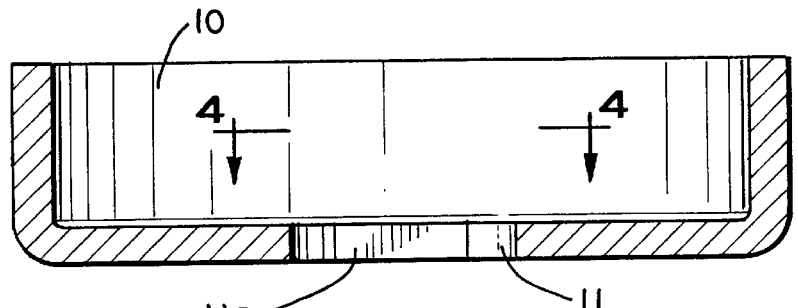
Figure 4:
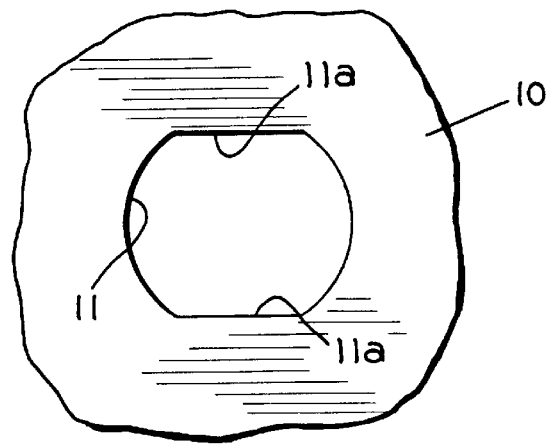
FIG. 4 is a top plan view of a portion of the outer rotor piece illustrated in FIG. 3.

Referring now to the drawings, there is illustrated in FIGS. 1, 2, and 3 the initial forming steps of a method for forming a rotor for an electromagnetic friction clutch in accordance with this invention. Initially, a flat circular blank (not shown) of material is provided. Preferably, the blank of material is formed from a magnetically permeable material, such as a ferromagnetic material. As shown in FIG. 1, the flat circular blank of material is initially formed by an appropriately shaped die (not shown) so as to provide partially formed outer rotor piece 10 which is generally cup-shaped. Thus, the cup-shaped outer rotor piece 10 includes a flat circular base portion having an annular flange portion extending thereabout. A second die forming operation and a re-striking operation are then performed on the outer rotor piece 10 so as to square off the corner between the flat circular base portion and the annular flange portion, as shown in FIG. 2. A piercing operation is next performed on the outer rotor piece 10 so as to form an opening 11 therethrough, as shown in FIGS. 3 and 4. The opening 11 is preferably concentric with the axis of rotation of the outer rotor piece 10. As best shown in FIG. 4, the opening 11 is preferably non-circular in shape. For example, the opening 11 may be generally circular in shape, but have one or more flats 11a formed thereon. Regardless of the specific shape, the non-circular opening 11 is provided to facilitate the proper orientation of the outer rotor piece 10 for subsequent metal working operations, as will be explained in detail below. The initial forming operations shown in FIGS. 1, 2, and 3 can be performed using conventional press machines.

Figure 5:
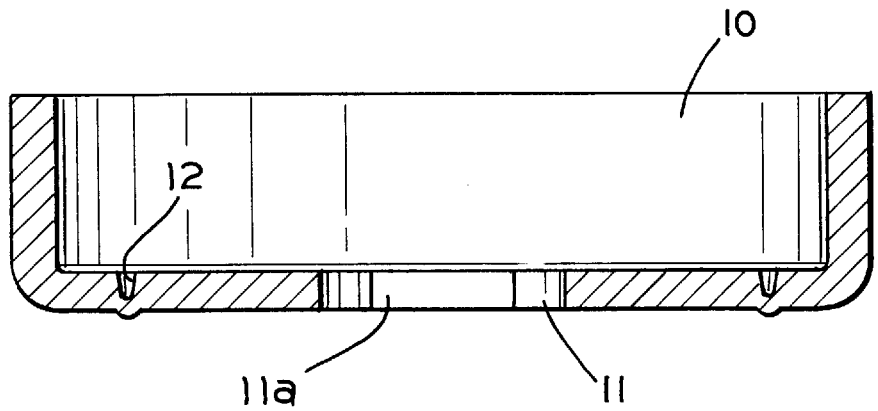
FIGS. 5, 6, and 7 are sectional elevational views showing the sequential forming of concentric rows of discontinuous recesses in the outer rotor piece illustrated in FIGS. 3 and 4.
Figure 6:
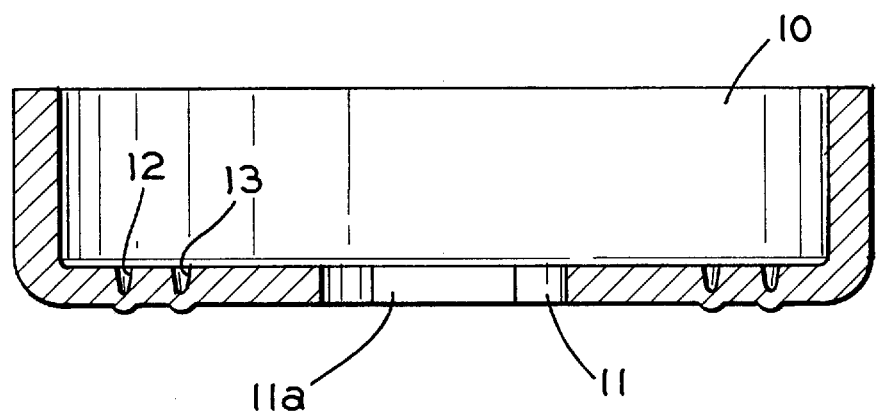
Figure 7:
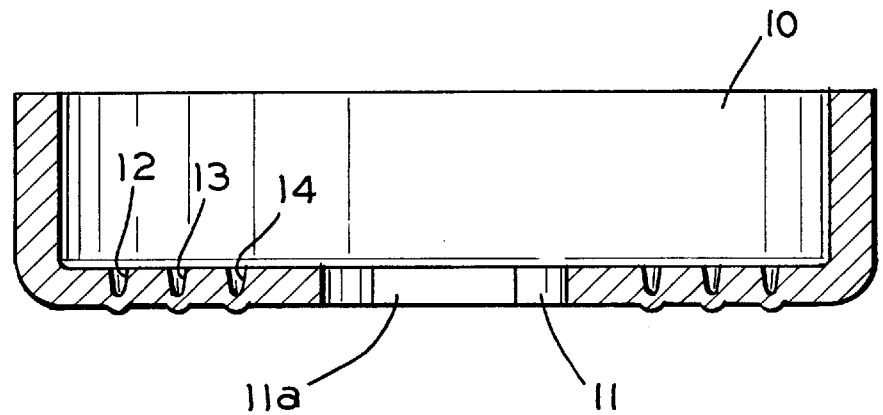

FIGS. 5, 6, and 7 show the sequential forming of a plurality of concentric rows of discontinuous banana-shaped recesses in the partially formed outer rotor piece illustrated in FIG. 3. A plurality of punches can be used in conventional press machines to form these recesses. The structure and operation of one of the punches will be described in detail below. Briefly, however, each of the punches includes a base having a plurality of punch embossments extending axially therefrom, one punch embossment for each of the recesses to be formed. A first punch is moved by a first press machine such that embossments thereon contact the inner surface of the flat circular base portion of the outer rotor piece 10 so as to form a first row of discontinuous recesses 12 therein. The first recesses 12 are preferably formed concentrically about the opening 11 and the axis of rotation of the outer rotor piece 10. Thereafter, a second punch is moved by a second press machine such that embossments thereon contact the inner surface of the flat circular base portion of the outer rotor piece 10 so as to form a second row of discontinuous recesses 13 therein. The second recesses 13 are preferably formed concentrically within the first recesses 12. Lastly, a third punch, is moved by a third press machine such that embossments thereon contact the inner surface of the flat circular base portion of the outer rotor piece 10 so as to form a third row of discontinuous recesses 14 therein. The third recesses 14 are preferably formed concentrically within the second recesses 13 and the first recesses 12. Preferably, the first, second, and third recesses 12, 13, and 14 do not extend completely through the flat circular base portion of the outer rotor piece 10, as shown in FIG. 7.

Figure 8:
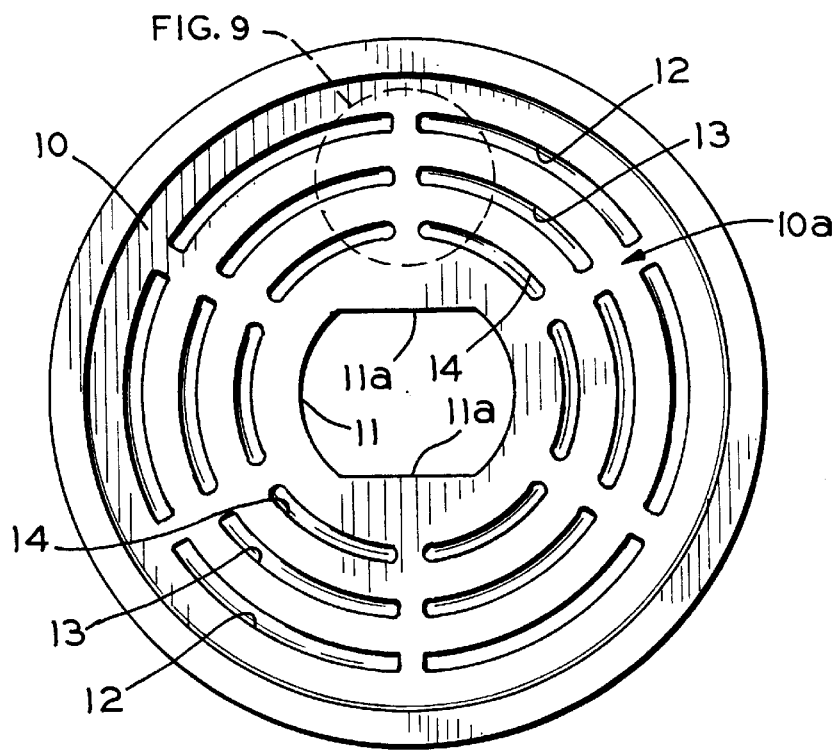
FIG. 8 is a top plan view of the outer rotor piece illustrated in FIG. 7 including the concentric rows of discontinuous recesses.
Figure 9:
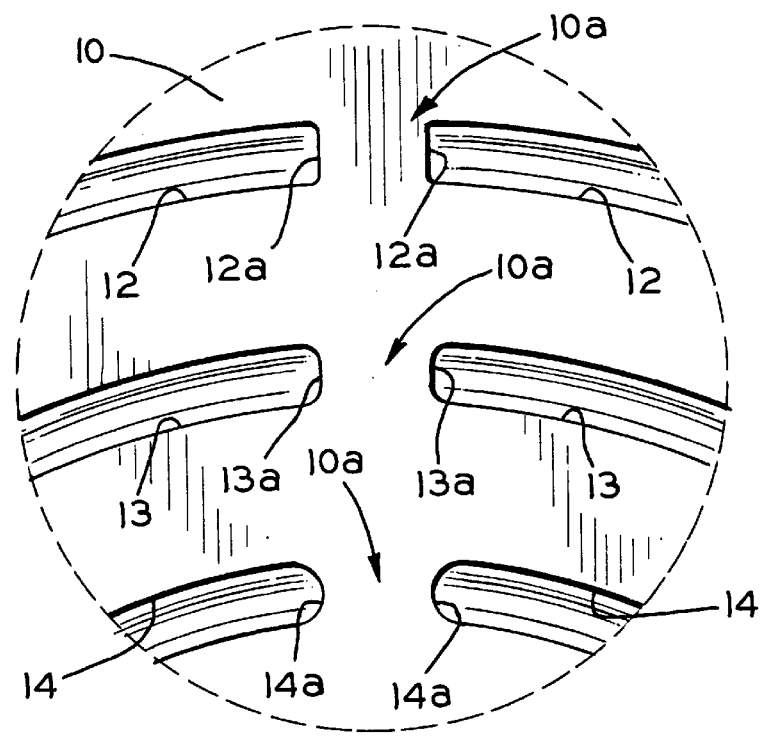
FIG. 9 is an enlarged top plan view of a portion of the outer rotor piece illustrated in FIG. 8.

FIG. 8 clearly illustrates the various recesses 12, 13, and 14 after having been sequentially formed according to the method described above. As shown therein, six of each of the banana-shaped recesses 12, 13, and 14 are equidistantly formed in the inner surface of the flat circular base portion of the outer rotor piece 10. However, a greater or lesser number of such recesses 12, 13, and 14 may be formed if desired. Alternatively, the arcuate lengths of the recesses 12, 13, and 14 may be unequal. In the illustrated embodiment, the recesses 12, 13, and 14 are radially aligned with one another so as to define a plurality of radially extending bridge areas or spokes, indicated generally at 10a, between the circumferential ends thereof. However, such alignment may be altered if desired. As discussed above, the recesses 12, 13, and 14 are formed sequentially, beginning first with the radially outermost recesses 12, followed by the radially intermediate recesses 13 and the radially innermost recesses 14. The importance of forming these recesses 12, 13, and 14 in this sequential manner is illustrated in detail in FIG. 9. As shown therein, the circumferential ends 14a of the radially innermost recesses 14 (adjacent to the radially innermost bridge area 10a) are virtually semi-circular in shape, corresponding closely to the semi-circular shapes of the ends of the embossments provided on the third punch which formed them. However, the circumferential ends 13a of the radially intermediate recesses 13 are somewhat squared off in shape, corresponding less closely to the semi-circular shapes of the ends of the embossments provided on the second punch which formed them. Lastly, the circumferential ends 12a of the radially outermost recesses 12 are virtually square in shape, corresponding little to the semi-circular shapes of the ends of the embossments provided on the first punch which formed them.

These distortions in the shapes of the circumferential ends of the recesses 12a and 13a are caused by the sequential formation of the recesses 12, 13, and 14 as described above. It has been found that the formation of the second recesses 13 causes some distortion of the circumferential ends of the first recesses 12 because material flows radially outwardly from the flat circular base portion of the outer pole piece 10 when engaged by the first punch embossments. Similarly, the formation of the third recesses 14 causes some distortion of the circumferential ends of both the second recesses 13 and the first recesses 12 because material flows radially outwardly from the flat circular base portion of the outer pole piece 10 when engaged by the second punch embossments. Such distortions are generally considered to be undesirable because they create internal stresses within the bridge areas 10a of the outer rotor piece 10. These internal stresses create weaknesses in the bridge areas 10a and can result in cracking and failure of the flat circular base portion of the outer rotor piece 10. The sequential forming of the recesses 12, 13, and 14 from the radially outermost area of the base portion to the radially innermost area of the base portion virtually eliminates any manufacturing related stresses in the radially innermost region of the bridge areas 10a, while focusing such stresses toward the radially outermost regions of the bridge area 10a. This orientation of the distortions is desirable because the radially innermost regions of the bridge areas 10a are subjected to the largest torsional and bending forces during operation of the electromagnetic friction clutch, while the radially outermost regions of the bridge areas 10a are subjected to the smallest torsional and bending forces during operation. Thus, the method of this invention increases the effective strength of the outer pole piece 10 by locating the stresses which are created during formation of the recesses 12, 13, and 14 in the radially outermost regions of the flat circular base portion, wherein the magnitude of torsional and bending stresses encountered during use are typically the smallest.

Current practice is to simultaneously form the radially outermost and innermost recesses 12 and 14 initially using a first punch, then subsequently to form the radially intermediate recesses 13 using a second punch. This method has been found to be undesirable for several reasons. First, the known method requires a relatively large amount of force to simultaneously form the first and third recesses 12 and 14, thereby increasing the size and cost of the press machine and causing premature wear and failure of the punch. Second, the known method generates distortions in both the radially innermost and outermost regions of the bridge areas 10a. As a result, the radially innermost regions of the bridge areas 10a are subject to premature failure for the reasons set forth above unless they are additionally processed to relieve such stresses, such as by shot peening, for example.

Figure 10:
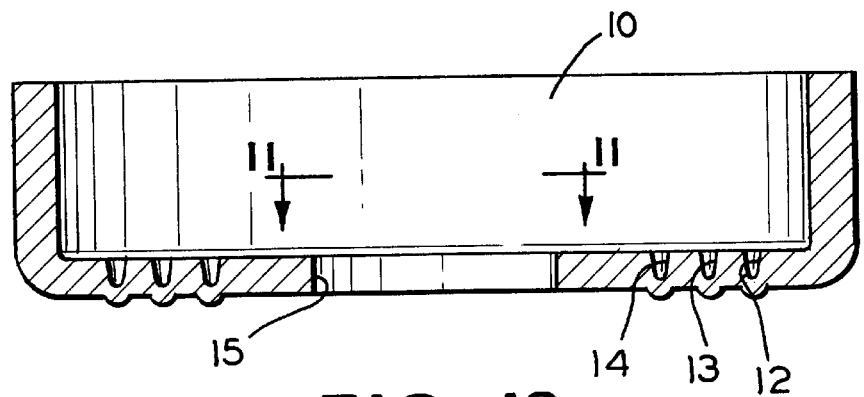
FIG. 10 is a sectional elevational view of the outer rotor piece illustrated in FIGS. 8 and 9 showing the formation of a circular opening through the base portion thereof.
Figure 11:
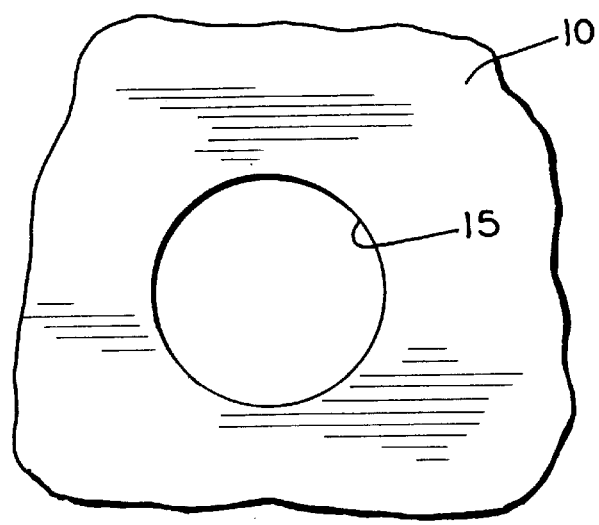
FIG. 11 is a top plan view of a portion of the outer rotor piece illustrated in FIG. 10.
Figure 12:
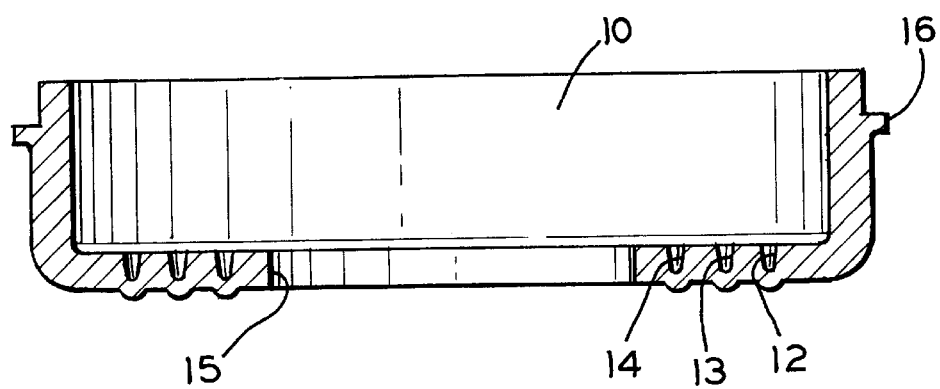
FIG. 12 is a sectional elevational view of the outer rotor piece illustrated in FIGS. 10 and 11 showing the formation of an annular rib on the outer circumferential surface thereof.
Figure 13:
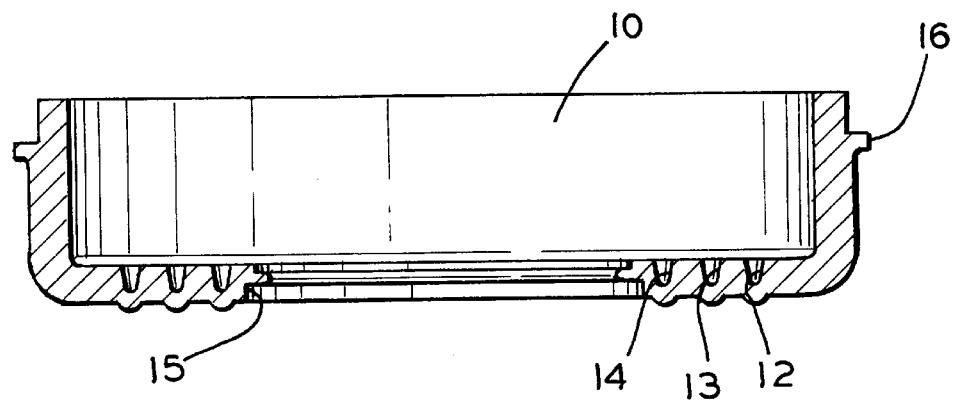
FIG. 13 is a sectional elevational view of the outer rotor piece illustrated in FIG. 12 showing the formation of an annular flange on the inner circumferential surface thereof.

Referring now to FIGS. 10 and 11, a piercing operation is next performed on the outer rotor piece 10 so as to form a circular opening 15 therethrough. The circular opening 15 is preferably concentric with the axis of rotation of the outer rotor piece 10. The piercing operation can be performed by a conventional press machine. Next, a portion of the outer circumferential surface of the annular flange portion of the outer rotor piece 10 is deformed so as to provide a circumferential rib 16 thereabout, as shown in FIG. 12. The rib 16 can be formed by any conventional metal working process. For example, the rib 16 may be formed by swaging some of the material of the annular flange portion downwardly away from the upper open end of the cup-shaped outer rotor piece 10 against a support surface. Thus, as shown in FIG. 13, the wall thickness of the annular flange portion of the outer rotor piece 10 is somewhat smaller between the rib 16 and the upper open end thereof than between the rib 16 and the base portion thereof. The purpose of the rib 16 will be explained below.

Figure 14:
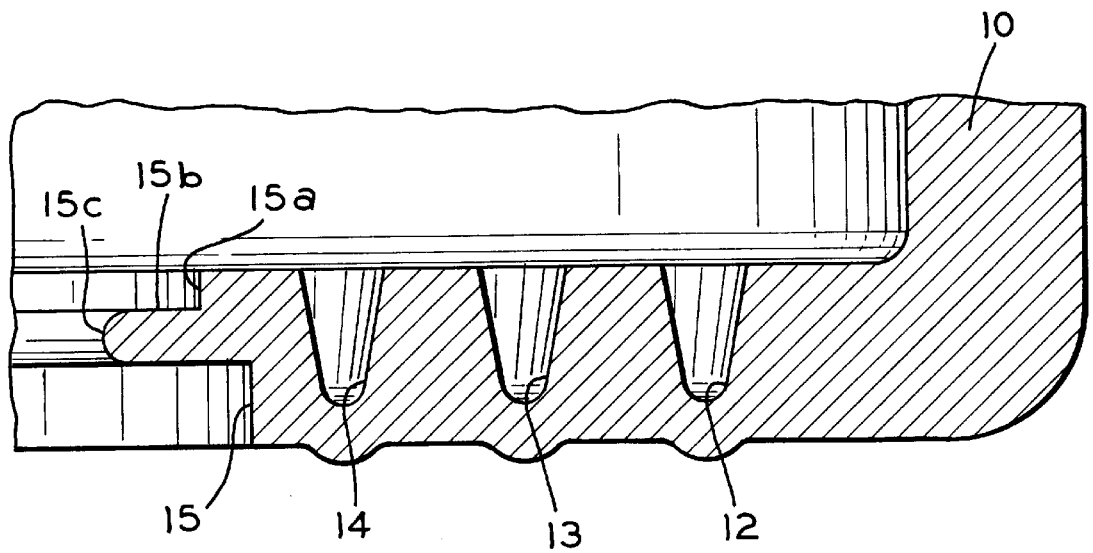
FIG. 14 is an enlarged sectional elevational view of a portion of the annular flange formed on the inner circumferential surface of the circular opening of the outer rotor piece illustrated in FIG. 13.
Figure 15:
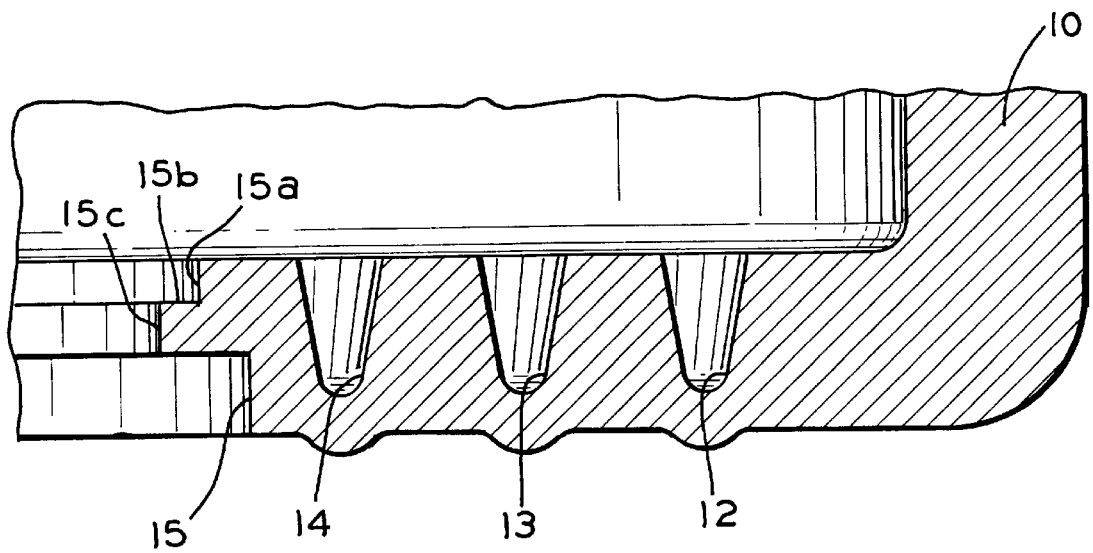
FIG. 15 is an enlarged sectional elevational view similar to FIG. 12 showing the trimming of the annular flange formed on the inner circumferential surface of the circular opening of the outer rotor piece.

Referring now to FIGS. 13 and 14, the next step in the method of this invention is to coin or otherwise deform portions of the circular opening 15 formed through the base portion of the outer rotor piece 10. To accomplish this, a portion of the flat base portion of the outer rotor piece 10 can be compressed between upper and lower dies (not shown). As a result of this compression, some of the metallic material of the base portion of the outer rotor piece 10 is extruded radially inwardly from the opening to define an axially extending shoulder 15a, a radially extending surface 15b, and an annular ridge 15c, as best shown in FIG. 14. The radially innermost surface of the annular ridge 15c is somewhat rounded because of this extrusion process. Thus, to provide an accurate dimension therein, a punch is used to trim off a portion of the annular ridge 15c so as to provide a flat axially extending surface 15d, as shown in FIG. 15, which defines an inner diameter.

Figure 16:
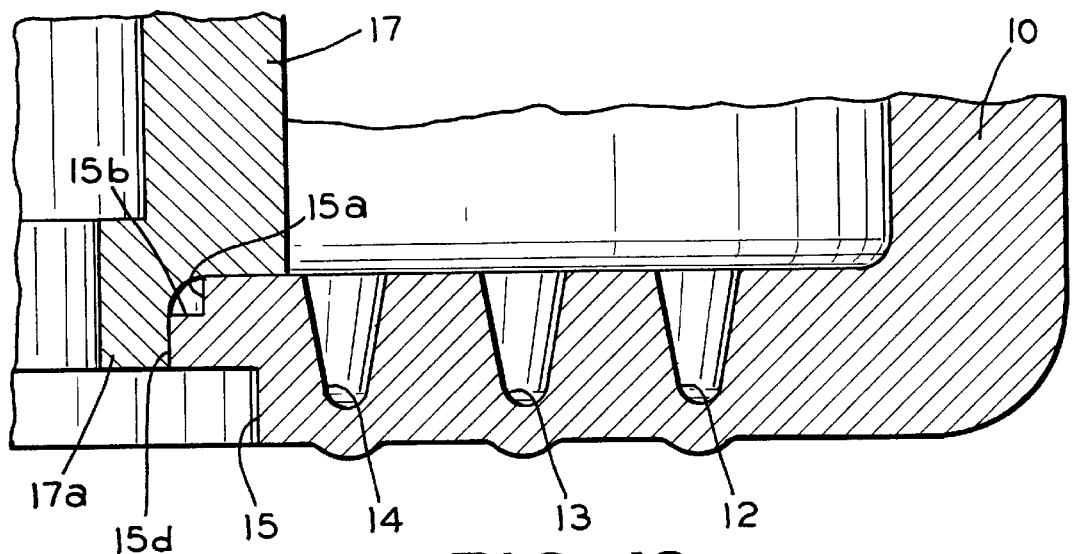
FIG. 16 is an enlarged sectional elevational view similar to FIG. 15 showing the installation of a hollow cylindrical inner rotor piece on the outer rotor piece to form a rotor preform.

The axially extending surface 15d of the opening 15 provides a seat to accurately position a hollow cylindrical inner rotor piece 17 relative to the outer rotor piece 10, as shown in FIG. 16. The inner rotor piece 17 is also formed from a magnetically permeable material, such as a ferromagnetic material, and includes an axially extending protrusion 17a. The protrusion 17a defines an outer diameter which preferably is slightly larger than the inner diameter of the axially extending surface 15d of the opening. Thus, the protrusion 17a extends within the opening 15 and is piloted in a press fit manner on the axially extending surface 15d so as to position the inner rotor piece 17 concentrically within the outer rotor piece 10. The axially extending shoulder 15a and the radially extending surface 15b function to provide an annular recess to accommodate a radius of curvature defined between the main portion of the inner rotor piece 17 and the axially extending protrusion 17a thereof. Following assembly in this manner, the inner rotor piece 17 can be secured to the outer rotor piece 10 in a conventional manner, such as by laser butt welding, to form a rotor preform.

Figure 17:
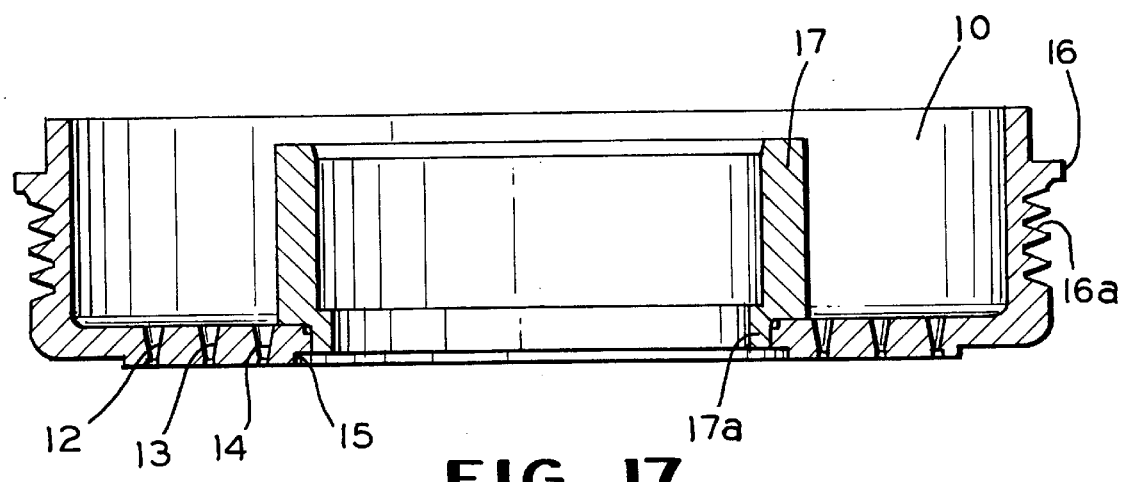
FIG. 17 is a sectional elevational view of the entire rotor preform illustrated in FIG. 16 after having been finished machined to form a rotor.

The last step in the method of forming a rotor for use in an electromagnetic friction clutch is to finish machine portions of the rotor preform. Referring to FIG. 17, it can be seen that several finish machining operations are performed on the rotor preform. First, the outer surface of the outer rotor piece 10 is machined to form a plurality of circumferential grooves 16a adjacent to the rim 16. These grooves 16a are provided to accommodate a grooved belt (not shown) thereabout to rotatably drive the rotor during use. The rib 16, however, is not machined and functions as a guide for the belt which is wrapped about the adjacent plurality of grooves 16a. Second, the portions of the lower surface of the base portion of the outer rotor piece 10 adjacent to the recesses 12, 13, and 14 are removed to form slots which extend completely therethrough. This machining of the recesses 12, 13, and 14 into through slots may be omitted if desired. Also, the portions of the lower surface of the base portion between the recesses 12, 13, and 14 are machined to provide a desired shape for that surface. If desired, other machining operations can be performed at this time to complete the finished rotor.

It will be appreciated that all of above-described the metal working steps (i.e., those steps which precede the finish machining step) can be performed using conventional press machines. For example, a series of transfer press machines can be arranged to quickly and efficiently perform each of the metal working steps described above and illustrated in FIGS. 1 through 16. The finish machining step illustrated in FIG. 17 is performed only after all of the previous metal working steps have been completed. Thus, the method of this invention minimizes the amount of machining which is required to finish the rotor for use in an electromagnetic friction clutch into a single operation which is performed at the conclusion of all of the metal working steps. The configuration of the outer and inner rotor pieces 10 and 17 allow the two pieces to be joined together by laser butt welding without additional machining.

Figure 18:
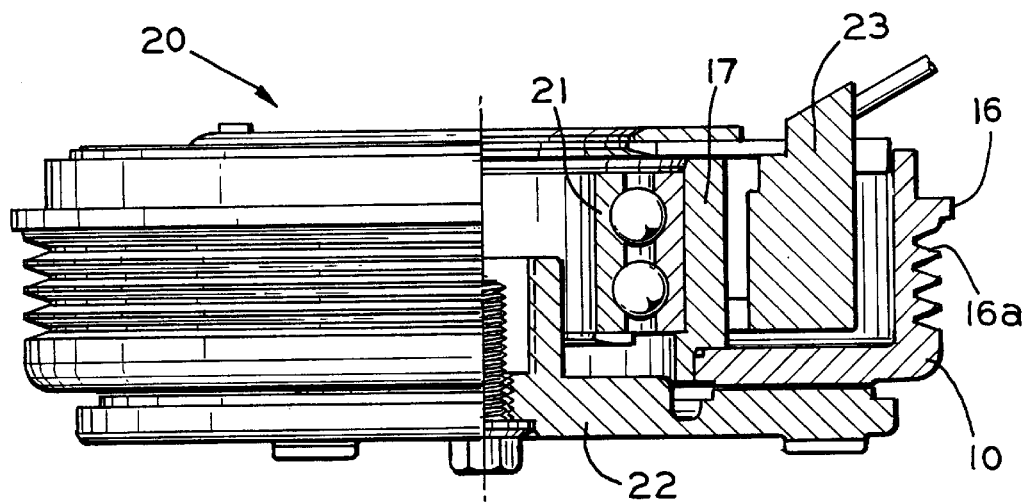
FIG. 18 is an elevational view, partially in cross section, of the rotor installed in an electromagnetic friction clutch.

Referring now to FIG. 18, there is illustrated an electromagnetic friction clutch, indicated generally at 20, including a rotor manufactured in accordance with the method of this invention. The basic structure and operation of the clutch 20 are well known in the art. The above-described rotor functions as the input member to the electromagnetic friction clutch 20 and is adapted to be rotatably driven by a belt wrapped thereabout. As mentioned above, the belt is connected to a source of rotational power so as to rotatably drive the rotor. The rotor is rotatably supported on an output member, such as an output shaft (not shown), by any conventional means, such as by a conventional roller bearing 21. The electromagnetic friction clutch 20 also includes an armature 22 which is connected to the output member for rotation therewith and for axial movement relative thereto in a known manner. The armature 22 is also formed from a magnetically permeable material, such as a ferromagnetic material. An electromagnet 23 is supported in a non-rotatable manner within the rotor. Normally, the armature 22 is maintained in the illustrated disengaged position, wherein it is axially spaced apart from the rotor. In this disengaged position, the armature 22 does not frictionally engage the rotor and, therefore, the output member is not rotatably driven by the rotor. When the electromagnet 23 is energized, the flow of magnetic flux causes the armature 22 to be moved axially to an engaged position, wherein it frictionally engages the rotor. In this engaged position, the armature 22 frictionally engages the rotor so as to cause the output member to be rotatably driven by the rotor.

Figure 19:
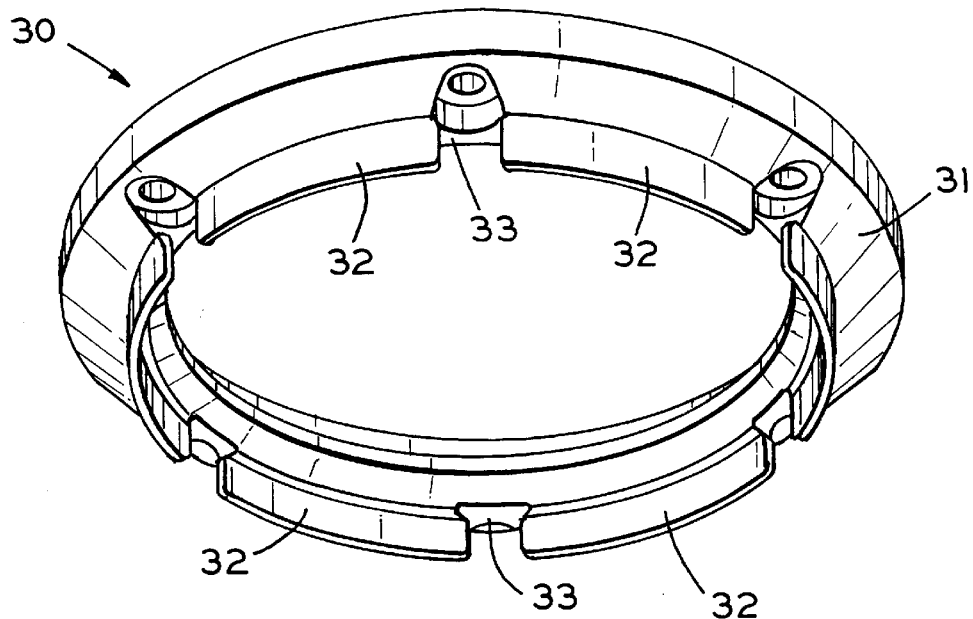
FIG. 19 is a perspective view of a punch which can be used in accordance with the method of this invention to form the annular rows of discontinuous recesses in the outer rotor piece illustrated in FIGS. 5 through 9.
Figure 20:
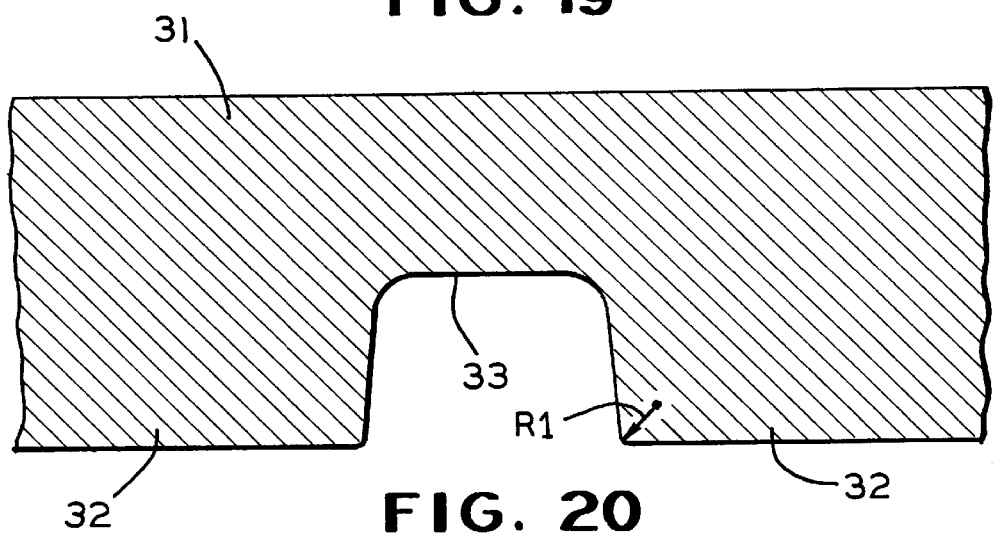
FIG. 20 is an enlarged sectional elevational view of a portion of the punch embossments of the punch illustrated in FIG. 19.

FIG. 19 illustrates a punch, indicated generally at 30, which can be used in accordance with the method of this invention to form the annular arrays of discontinuous recesses in the outer rotor piece illustrated in FIGS. 5 through 9. Although the illustrated punch 30 is shown as a unitary piece, the punch 30 may be formed from a plurality of individual segments, as is known in the art. The illustrated punch 30 is generally annular shape and includes a base portion 31 having a plurality of punch embossments 32 extending generally axially therefrom. Recesses 33 are defined between the circumferential ends of adjacent ones of the punch embossments 32. The structures of two of the punch embossments 32 are illustrated in detail in FIG. 20. As shown therein, the punch embossments 32 extend axially from the base portion 31 at a relative small draft angle, typically about eight degrees. The outer edge of each of the punch embossments 32 is defined by a radius identified as R1 in FIG. 20. It has been found to be desirable to make the magnitude of the radius R1 very small, not to exceed 0.015 inch and preferably in the range of from about 0.005 inch to about 0.010 inch.

Figure 21:
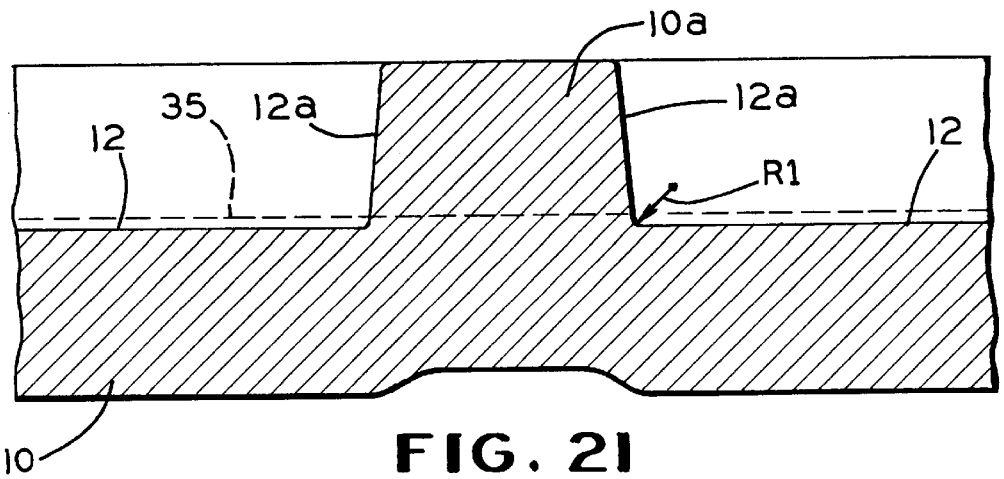
FIG. 21 is an enlarged sectional elevational view of a portion of the recesses formed in the outer pole piece by the punch illustrated in FIG. 19.
Figure 22:
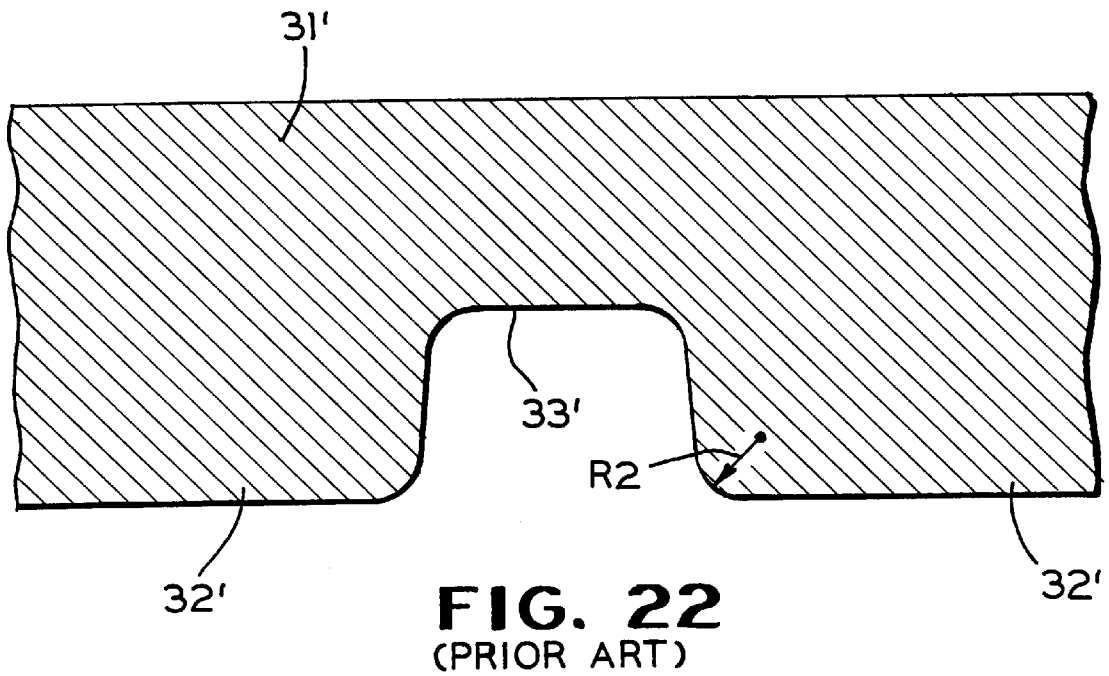
FIG. 22 is a sectional elevational view similar to FIG. 20 showing a portion of a prior art structure for the punch embossments of the punch illustrated in FIGS. 19 and 20.

When the punch 30 is moved into contact with the upper surface of the base portion of the outer rotor piece 10 as described above, the punch embossments 32 form the recesses therein, such as shown at 12 in FIG. 21. Subsequently, as also described above, a finish machining process is performed on the lower surface of the base portion of the outer rotor piece 10 to remove material therefrom. The dotted line 35 in FIG. 21 illustrates the path of movement of the cutting tool used to perform the finish machining operation. Thus, as shown FIG. 21, the cutting tool removes the material of the base portion of the outer rotor piece 10 which is located beneath the dotted line 35. It can be seen that because of the very small radius R1 defined by the outer edge of the punch, embossments 32, the corresponding radius R1 defined at the junction of the bottoms of the recesses 12 with the unembossed bridge area 10a is located completely beneath the line 35 of movement of the cutting tool. Thus, a relatively sharp edge is formed at the junction of the bridge area 10a with the lower surface of the finish machined base portion of the outer rotor piece 10.

This is contrasted with the structure of the prior art punch 30' illustrated in FIG. 21. As shown therein, the prior art punch 30' includes a base portion 31' having a plurality of punch embossments 32' extending generally axially therefrom. Recesses 33' are defined between the circumferential ends of adjacent ones of the punch embossments 32'. The prior art punch embossments 32' also extend axially from the base portion 31' at a relative small draft angle, typically about eight degrees. However, the outer edge of each of the punch embossments 32' is defined by a radius identified as R2 in FIG. 21 which is much larger than the radius R1. Typically, the magnitude of the radius R2 does not exceed 0.100 inch and preferably approximately 0.060 inch.

Figure 23:
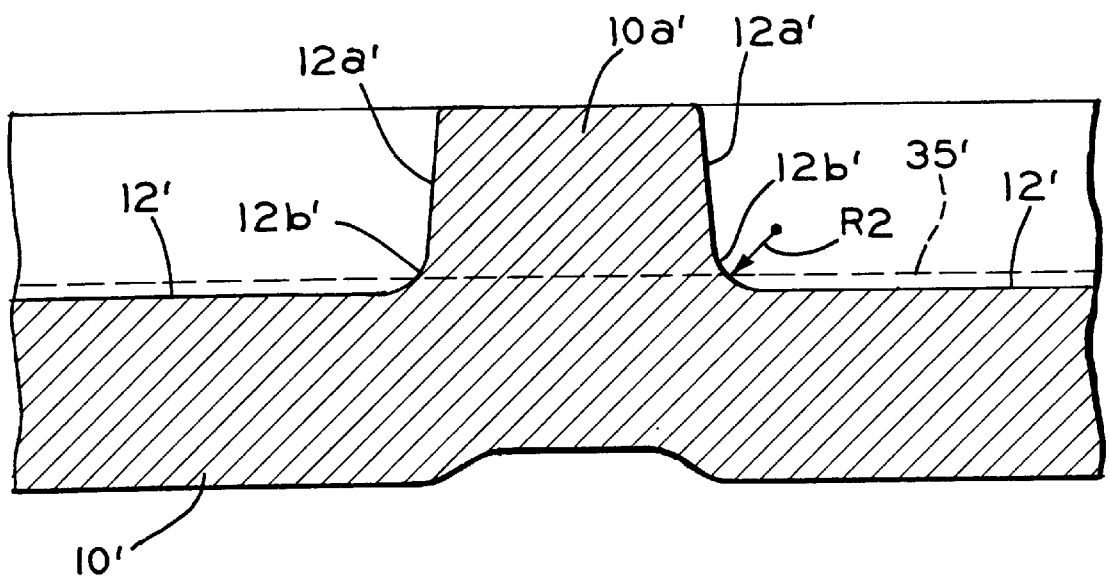
FIG. 23 is an enlarged sectional elevational view of a portion of the recesses formed in a prior art outer pole piece by the prior art punch illustrated in FIG. 19.

When the prior art punch 30' is moved into contact with the upper surface of the base portion of the outer rotor piece 10', the prior art punch embossments 32' form the recesses therein, such as shown at 12' in FIG. 23. Subsequently, as also described above, a finish machining process is performed on the lower surface of the base portion of the outer rotor piece 10' to remove material therefrom. The dotted line 35' in FIG. 23 illustrates the path of movement of the cutting tool used to perform the finish machining operation. Thus, as shown FIG. 23, the cutting tool removes the material of the base portion of the outer rotor piece 10' which is located beneath the dotted line 35'. It can be seen that because of the relatively large radius R2 defined by the outer edge of the prior art punch embossments 32', the corresponding radius R2 defined at the junction of the bottoms of the recesses 12' with the unembossed bridge area 10a' is not located, completely beneath the line 35 of movement of the cutting tool. Rather, a burr or web 12b' is formed at the junction of the bridge area 10a' with the lower surface of the finish machined base portion of the outer rotor piece 10'. Burrs and webbing of this type are undesirable because they create stress risers in the base portion of the outer rotor piece 10', resulting in internal weaknesses. The improved punch embossments 32 of this invention having the reduced radius R1 provide consistent control of stress risers by eliminating burrs and webbing of this type.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, the order in which the various metal working processes are performed may be varied if desired. Also, the rotor may be embodied as a two pole rotor, having only one row of banana-shaped recesses formed therein.

What is claimed is:

1. A method of forming a rotor piece for use in an electromagnetic clutch comprising the steps of:
    (a) providing a cup-shaped rotor piece including a base portion and an annular flange portion;
    (b) forming a first recess in said base portion; then
    (c) forming a second recess in said base portion radially inwardly of said first recess; and then
    (d) forming a third recess in said base portion radially inwardly of said second recess.

2. The method defined in claim 1 wherein said step (b) is performed by forming a first arcuate recess in said base portion.

3. The method defined in claim 2 wherein said step (c) is performed by forming a second arcuate recess in said base portion.

4. The method defined in claim 3 wherein the second arcuate recess is concentric with the first arcuate recess.

5. The method defined in claim 3 wherein said step (d) is performed by forming a third arcuate recess in said base portion.

6. The method defined in claim 5 wherein the third arcuate recess is concentric with the second arcuate recess.

7. The method defined in claim 1 wherein said step (b) is performed by forming a first plurality of discontinuous recesses in said base portion.

8. The method defined in claim 7 wherein said step (c) is performed by forming a second plurality of discontinuous recesses in said base portion.

9. The method defined in claim 8 wherein said step (d) is performed by forming a third plurality of discontinuous recesses in said base portion.

10. The method defined in claim 7 wherein said step (c) is performed by forming a second plurality of discontinuous recesses in said base portion that are concentric with the first plurality of discontinuous recesses.

11. The method defined in claim 10 wherein said step (d) is performed by forming a third plurality of discontinuous recesses in said base portion that are concentric with the second plurality of discontinuous recesses.

* * * * *